United States Patent
Jaiswal et al.

(10) Patent No.: US 12,058,186 B2
(45) Date of Patent: Aug. 6, 2024

(54) PRIVATE AUDIO COMMUNICATION IN A CONFERENCE CALL

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); Paul Llamas Virgen, Guadalajara (MX)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/060,035

(22) Filed: Nov. 30, 2022

(65) Prior Publication Data
US 2024/0179194 A1 May 30, 2024

(51) Int. Cl.
*G06F 15/16* (2006.01)
*H04L 65/1083* (2022.01)
*H04L 65/403* (2022.01)

(52) U.S. Cl.
CPC ........ *H04L 65/403* (2013.01); *H04L 65/1083* (2013.01)

(58) Field of Classification Search
CPC ........................ H04L 65/403; H04L 65/1083
USPC ........................................ 709/204, 227, 228
See application file for complete search history.

(56) References Cited

U.S. PATENT DOCUMENTS

| | | | |
|---|---|---|---|
| 8,370,142 B2 | 2/2013 | Frankel et al. | |
| 9,253,332 B2 | 2/2016 | Dye et al. | |
| 9,401,937 B1 | 7/2016 | Gottlieb | |
| 10,505,998 B1 | 12/2019 | Ackerman et al. | |
| 11,153,353 B1* | 10/2021 | Padhye | H04L 65/1069 |
| 11,343,293 B1* | 5/2022 | Slotznick | H04N 5/272 |
| 2005/0060368 A1* | 3/2005 | Wang | H04L 12/185 |
| | | | 709/204 |
| 2005/0276405 A1* | 12/2005 | Fernandes | H04M 3/56 |
| | | | 379/202.01 |

(Continued)

FOREIGN PATENT DOCUMENTS

| | | |
|---|---|---|
| CN | 101110686 A | 1/2008 |
| CN | 101841422 A | 9/2010 |

(Continued)

OTHER PUBLICATIONS

International Searching Authority, "Notification of Transmittal of the international Search Report and the Written Opinion of the International Searching Authority, or Declaration," Patent Cooperation Treaty, Feb. 26, 2024, 7 pages, International Application No. PCT/CN2023/134205.

*Primary Examiner* — Liang Che A Wang

(74) *Attorney, Agent, or Firm* — Rakesh Roy

(57) ABSTRACT

A method, computer system, and a computer program product for private audio communication in a conference call is provided. The present invention may include receiving a mute request from a first participant in a conference call. The present invention may also include muting the first participant in the conference call. The present invention may further include capturing an audio from the muted first participant. The present invention may include transmitting the captured audio to a second participant in the conference call over a private communication channel.

20 Claims, 3 Drawing Sheets

(56) References Cited

U.S. PATENT DOCUMENTS

| | | | | |
|---|---|---|---|---|
| 2006/0025206 A1* | 2/2006 | Walker | ............... | G07F 17/32 463/20 |
| 2008/0175230 A1* | 7/2008 | Brand | ............... | H04L 12/189 370/352 |
| 2018/0139413 A1 | 5/2018 | Diao | | |

FOREIGN PATENT DOCUMENTS

| | | | | |
|---|---|---|---|---|
| CN | 102811205 A | 12/2012 | | |
| CN | 112822431 A | 5/2021 | | |
| WO | WO-2008092148 A1 * | 7/2008 | ............ | H04L 67/18 |

\* cited by examiner

PRIVATE AUDIO COMMUNICATION IN A CONFERENCE CALL

BACKGROUND

The present invention relates generally to the field of computing, and more particularly to web conferencing.

Web conferencing, including, for example, audio and/or video-based conferencing is on the rise. Part of this rise is attributed to more people working remotely, attending classes remotely, and attending virtual events. Essentially, web conferencing may leverage a network, such as the Internet, to enable real-time communication between multiple participants in separate locations. Web conferencing has become a valuable tool to foster collaboration using features such as file sharing and screen sharing.

SUMMARY

Embodiments of the present invention disclose a method, computer system, and a computer program product for private audio communication in a conference call. The present invention may include receiving a mute request from a first participant in a conference call. The present invention may also include muting the first participant in the conference call. The present invention may further include capturing an audio from the muted first participant. The present invention may include transmitting the captured audio to a second participant in the conference call over a private communication channel.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
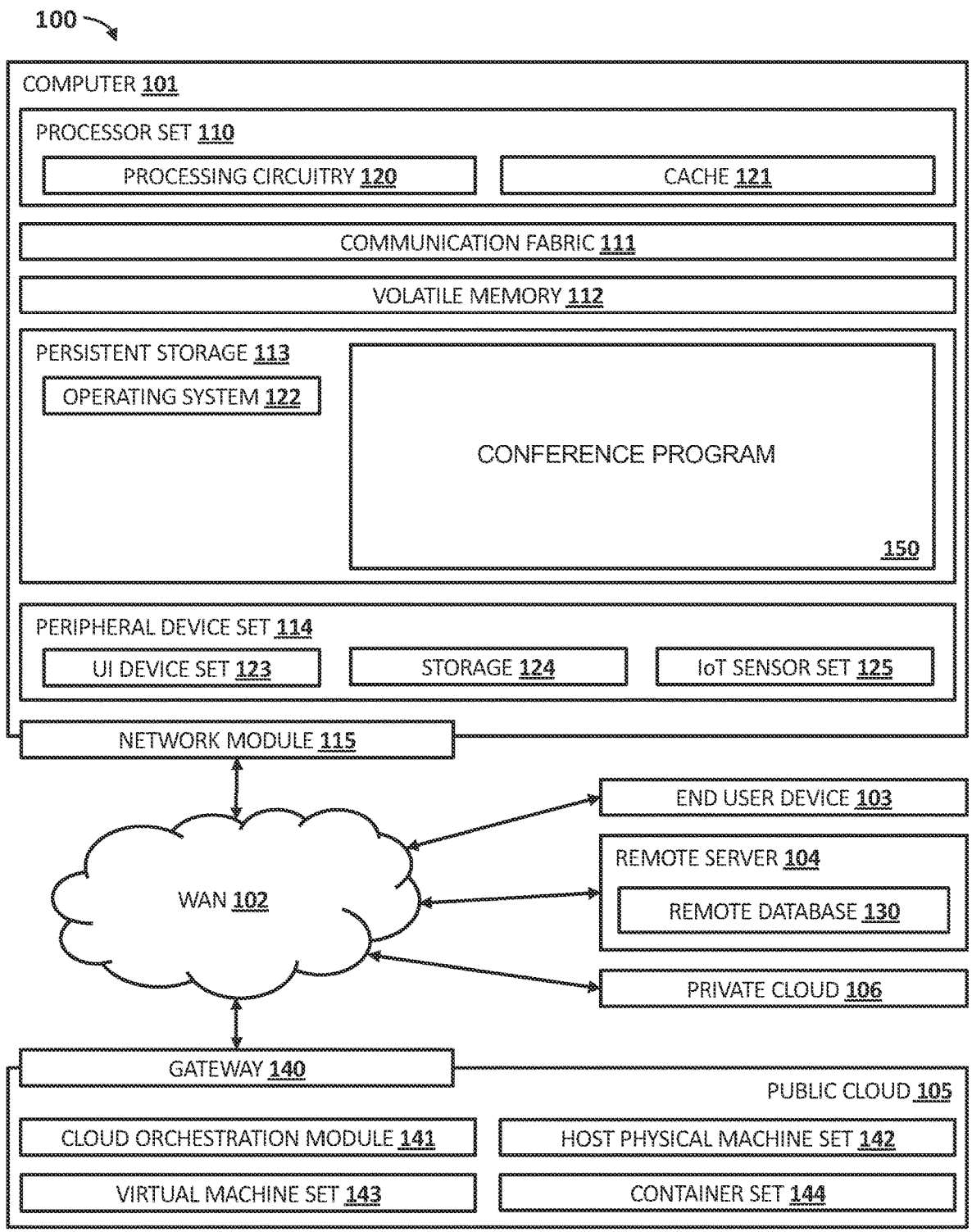
FIG. 1 illustrates a networked computing environment according to at least one embodiment.

The following described exemplary embodiments provide a system, method, and computer program product for establishing a private secure voice channel during a conference call. As such, the present embodiment has the capacity to improve the technical field of web conferencing by providing a private communication channel during a conference call to exchange audio data between a first participant and a second participant without establishing a breakout session.

As described previously, web conferencing, including, for example, audio and/or video-based conferencing is on the rise. Part of this rise is attributed to more people working remotely, attending classes remotely, and attending virtual events. Essentially, web conferencing may leverage a network, such as the Internet, to enable real-time communication between multiple participants in separate locations. Web conferencing has become a valuable tool to foster collaboration using features such as file sharing and screen sharing.

However, while web conferencing may be useful for open communication between all the participants on a conference call, there may be certain situations where one participant may wish to privately communicate a message to another participant without the other participants on the conference call being notified of the private communication. In these situations, if the receiving participant is a presenter sharing their screen, text messaging may not be a viable option because the text message may be visible to the other participants who have access to the shared screen.

Therefore, it may be advantageous to, among other things, provide a way to establish a private communication channel between select participants in a conference call that is separate from a conference communication channel open to all participants in the conference call. It may also be advantageous to establish the private communication channel between the select participants in a virtual meeting room shared by all of the other participants. It may be further advantageous to enable the exchange of audio data between the select participants over the private communication channel in a manner that is invisible to the other participants in the conference call. It may be advantageous to transmit audio data over the private communication channel to a receiving participant, while the receiving participant is communicating with the other participants over the conference communication channel, such that only the receiving participants and not the other participants, are able to hear the transmitted audio data.

As such, embodiments of the present disclosure may extend a mute functionality on a source device to establish a private communication channel between the source device and a destination device. More specifically a conference program may receive a mute request from a first participant in a conference call. Then, the conference program may mute the first participant in the conference call. Next, the conference program may capture an audio snippet from the muted first participant. Thereafter, the conference program may transmit the captured audio snippet to a second participant in the conference call over a private communication channel, where the transmitted captured audio snippet may be playable to the second participant without notifying other participants in the conference call.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as conference program 150. In addition to conference program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and conference program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, conference program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The conference program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the conference program 150 to establish a private communication channel between select participants in a conference call that is separate from a conference communication channel open to all participants in the conference call. Embodiments of the present disclosure are explained in more detail below with respect to FIGS. 2 and 3.

Figure 2:
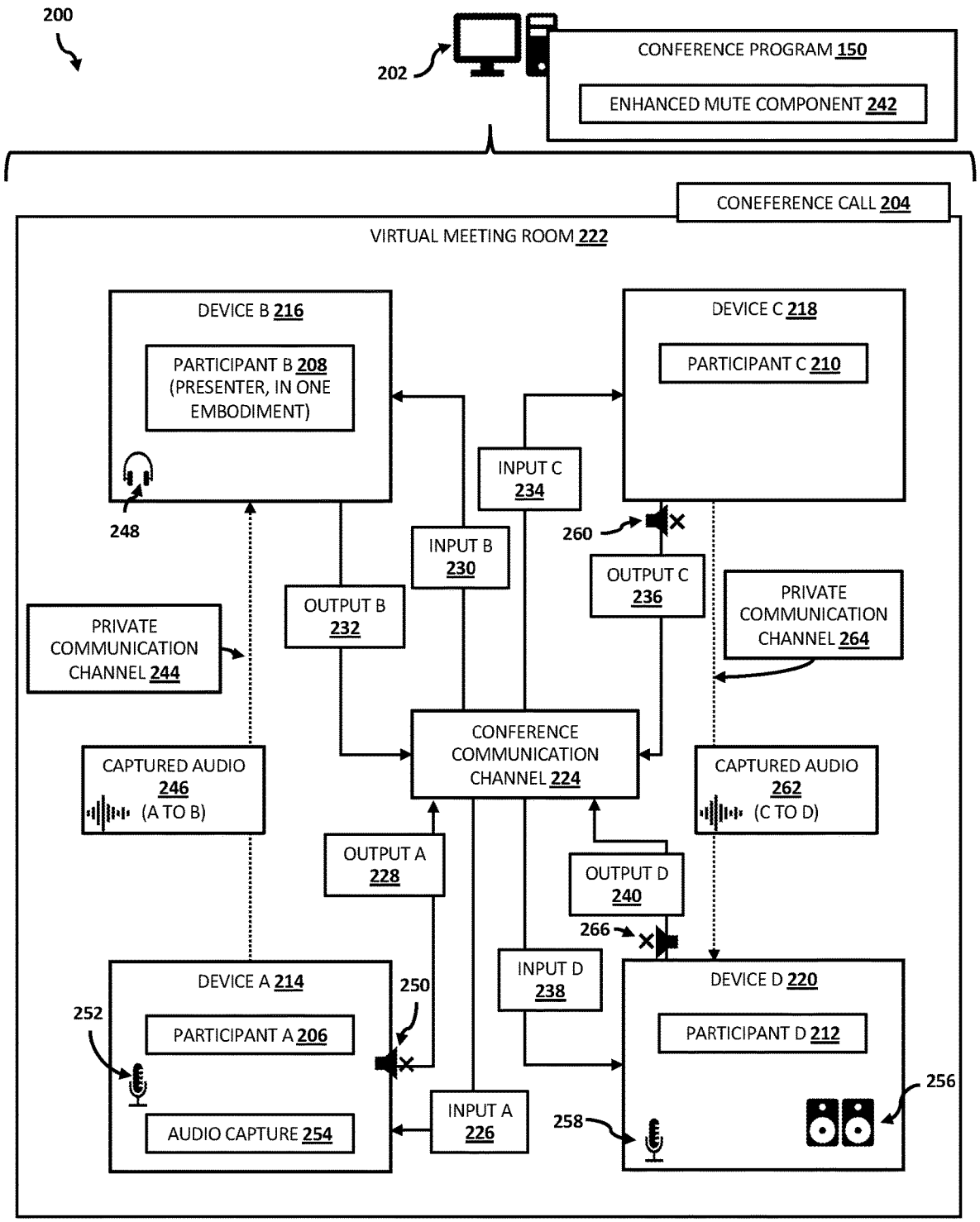
FIG. 2 is a schematic block diagram of a virtual meeting environment according to at least one embodiment.

Referring now to FIG. 2, a schematic block diagram of a virtual meeting environment 200 according to at least one embodiment is depicted. According to one embodiment, the virtual meeting environment 200 may include a computer system 202 having a tangible storage device and a processor that is enabled to run the conference program 150.

According to one embodiment, the conference program 150 running on the computer system 202 may utilize one or more components (e.g., computer 101; EUD 103; WAN 102) of the computer environment 100 described above with reference to FIG. 1. In one embodiment, the computer system 202 may include one or more computers (e.g., computer 101) which may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, and/or querying a database. Further, the conference program 150 may utilize one or more sensors, such as the IoT sensor set 125 of the computer environment 100. In addition to the examples previously described with reference to FIG. 1, IoT sensor set 125 may further include, but is not limited to, headsets (e.g., integrated microphone and headphone), speakers, cameras, and/or microphones.

According to one embodiment, aspects of the computer system 202 may operate in a cloud computing service model, such as Software as a Service (SaaS), Platform as a Service (PaaS), or Infrastructure as a Service (IaaS). In one embodiment, the computer system 202 may also be implemented as a cloud computing deployment model, such as a private cloud, community cloud, public cloud, or hybrid cloud.

In one embodiment, the conference program 150 may include a single computer program or multiple program modules or sets of instructions being executed by the processor of the computer system 202. In one embodiment, the conference program 150 may include routines, objects, components, units, logic, data structures, and actions that may perform particular tasks or implement particular abstract data types. In one embodiment, the conference program 150 may be practiced in distributed cloud computing environments where tasks may be performed by local and/or remote processing devices which may be linked through a communication network (e.g., WAN 102). In at least one embodiment, the conference program 150 may be executed on a single computing device (e.g., computer 101).

According to one embodiment, a user may interact with the conference program 150 running on computer system 202 to initiate or join a conference call 204 including a set of participants (e.g., Participant A 206; Participant B 208; Participant C 210; Participant D 212). In one embodiment, the user may include one or more meeting hosts, meeting leaders, and/or presenters associated with conference call 204. In some embodiments, the user may be part of the set of participants (e.g., Participant A 206; Participant B 208; Participant C 210; Participant D 212). In one embodiment, the set of participants (e.g., Participant A-D 206-212) may include any number of three or more participants. In one embodiment, the set of participants may be referred to as all participants in the conference call 204.

According to one embodiment, the conference program 150 may be implemented as a web browser application and/or a software application hosted on a conference server (e.g., remote server 104). In one embodiment, one or more components of the conference program 150 may be implemented in an internet-enabled computing device (e.g., Device A 214; Device B 216; Device C 218; Device D 220) associated with each of participants A-D 206-212, respectively. In at least one embodiment, each of Devices A-D 214-220 may be substantially similar to computer 101 and/or EUD 103 described with reference to FIG. 1. As illustrated in FIG. 2, Participant A 206 may be associated with Device A 214, Participant B 208 may be associated with Device B 216, Participant C 210 may be associated with Device C 218, and Participant D 212 may be associated with Device D 220. Thus, each of participants A-D 206-212 may interact with the conference program 150 using their respective Device A-D 214-220 to join the conference call 204.

In one embodiment, the conference call 204 may include any computerized version of a real-time conversation/discussion between the set of participants. Throughout the present disclosure, conference call 204 may be referred to interchangeably as a web conference, a teleconference, a video conference, or a virtual meeting. In one embodiment, the conference program 150 may enable the set of participants to join the conference call 204 by connecting to a virtual meeting room 222. In one embodiment, the virtual meeting room 222 may include a conference communication channel 224, which may enable communication between all participants (e.g., real-time audio, video, and text-based communication, in addition to application sharing, screen sharing, and file sharing between the set of participants logged into the virtual meeting room 222). In one embodiment, the conference communication channel 224 may provide central connectivity (e.g., a conference bridge) for open (e.g., public) communication between the set of participants in the virtual meeting room 222 using any suitable communication protocol described with reference to FIG. 1. In one embodiment, the conference communication channel 224 may be provided by the conference server (e.g., remote server 104).

According to one embodiment, each of Devices A-D 214-220 may be connected to the conference communication channel 224 to communicate with the other of Devices A-D 214-220 in the virtual meeting room 222. In one embodiment, the connection between the conference communication channel 224 and each of Devices A-D 214-220 may include a corresponding input stream for receiving input (e.g., audio, video, text, application, screen, and/or file) from the virtual meeting room 222 (e.g., from the other devices). In one embodiment, the connection between the conference communication channel 224 and each of Devices A-D 214-220 may also include a corresponding output stream for transmitting output (e.g., audio, video, text, application, screen, and/or file) to the virtual meeting room 222 (e.g., to the other devices). For example, Device A 214 may include an Input A 226 (e.g., for the input stream) and an Output A 228 (e.g., for the output stream); Device B 216 may include an Input B 230 and an Output B 232; Device C 218 may include an Input C 234 and an Output C 236; and Device D 220 may include an Input D 238 and an Output D 240.

According to one embodiment, the conference program 150 may include an enhanced mute component 242 which may extend a mute functionality of a first participant's (e.g., Participant A 206) computing device (e.g., Device A 214) to establish a private communication channel 244 between the first participant and a second participant (e.g., Participant B 208 using Device B 216) for sharing a captured audio data 246 in a privacy preserving manner. Throughout the present disclosure, the functionality of the enhanced mute component 242 may be described with reference to the conference program 150. In one embodiment, the private communication channel 244 and the conference communication channel 224 may coexist in the same virtual meeting room 222 of the conference call 204 (e.g., no breakout room/session needed), as will be detailed further below. In at least one embodiment, the same virtual meeting room 222 may include multiple private communication channels, as will be detailed further below.

According to one embodiment, Participant B 208 may have a presenter role in the conference call 204. As the presenter, Participant B 208 may share data, such as, audio (e.g., via an integrated microphone component of a headset 248), video, and/or live screen images (e.g., screen sharing Device B 216) with the other participants (e.g., Participant A 206; Participant C 210; Participant D 212) in the virtual meeting room 222. In one embodiment, the Output B 232 of Device B 216 (including the data shared by Participant B 208) may be transmitted to the other participants (e.g., Participant A 206; Participant C 210; Participant D 212) via the conference communication channel 224. In one embodiment, the headset 248 may also include an integrated headphone component. In one embodiment, the headphone may enable a single user (e.g., Participant B 208) to listen to an audio source (e.g., from Input B 230) privately, in contrast to a speaker, which may emit sound into the open air for anyone nearby to hear.

In one embodiment, Participant A 206 (e.g., first participant) may wish to privately communicate a message to Participant B 208 (e.g., second participant) without the other participants (e.g., Participant C 210 and Participant D 212) on the conference call 204 being notified of (e.g., hearing) the private communication. In this embodiment, if the receiving Participant B 208 is the presenter sharing their screen (e.g., via Output B 232), text messaging may not be a viable option because the text message may be visible to the other participants (e.g., Participant C 210 and Participant D 212) who have access to the shared screen (e.g., screen images of the Device B 216 may be transmitted to the other participants via the conference communication channel 224).

To address the above situation, embodiments of the present disclosure may extend a mute functionality of the Device A 214 of Participant A 206 (e.g., source device) to establish the private communication channel 224 between device A 208a (e.g., source device) and device B 208b of participant B 206b (e.g., destination device).

In one embodiment, Participant A 206 may interact with Device A 214 (e.g., by selecting a mute option) to transmit a mute request 250 to the conference program 150. In one embodiment, the conference program 150 may receive the mute request 250 from the Participant A 206 (e.g., via Device A 214) in the conference call 204. In response, the conference program 150 may mute Participant A 206 (e.g., first participant) in the conference call 204. More specifically, the conference program 150 may mute an audio output in the Output A 228 of Participant A's Device A 214. As such, audio captured by a microphone 252 associated with Device A 214 may not be included in Output A 228 and may not be transmitted to the other participants (e.g., Participant B 208; Participant C 210; Participant D 212) in the virtual meeting room 210 via conference communication channel 224. In one embodiment, Participant A 206 may continue to receive data (e.g., audio, video) from the conference call 204 via the Input A 226.

However, while microphone 252 may be muted to the other participants via conference communication channel 224, the conference program 150 may enable Participant A 206 to use the microphone 252 to capture an audio snippet while implementing the mute request 250. In one embodiment, responsive to triggering the mute request 250, the conference program 150 may provide an audio capture option 254 on Device A 214. In one embodiment, Participant A 206 may select the audio capture option 254 to record or capture (e.g., live record) an audio snippet (e.g., voice message) using microphone 252. In some embodiments, the audio capture option 254 may also enable Participant A 206 to select a pre-recorded audio snippet (e.g., stored on Device A 214) for capture by the conference program 150. Thus, the captured audio 246 from Participant A 206 may include a live recorded audio snippet and/or a pre-recorded audio snippet.

In one embodiment, the conference program 150 may enable Participant A 206 to indicate (e.g., define) the destination (e.g., receiving participant; second participant) for the captured audio 246. In one embodiment, the conference program 150 may enable Participant A 206 to provide a destination input by using a voice input and/or by interacting with the Device A 214 to select the destination. Once the conference program 150 determines the destination/destination device for the captured audio 246, the conference program 150 may generate (e.g., establish) the private communication channel 244 between the source device (e.g., of the first participant; sending participant) and the destination device (e.g., of the second participant; receiving participant). For example, as illustrated in FIG. 2, Participant A 206 may indicate Participant B 208 as the destination for the captured audio 246. In one embodiment, the captured audio 246 may include the audio snippet captured by the Device A 214 (e.g., via microphone 252 and/or uploaded from storage) and may also indicate the source participant and the destination participant (e.g., "A to B"). In this example, the conference program 150 may determine Participant B 208 as the destination for the captured audio 246. As such, the conference program 150 may establish the private communication channel 244 between Device A 214 (e.g., source device) and Device B 216 (e.g., destination device) of Participant B 208 (e.g., second participant). Thereafter, the conference program 150 may transmit the captured audio 246 to Participant B 208 in the conference call 204 over the private communication channel 244. In one embodiment, the conference program 150 dynamically establish the private communication channel 244 as a temporary communication channel for a duration of completing the transmission of the captured audio to Device B 216 (e.g., destination device) of Participant B 208 (e.g., second participant).

According to one embodiment, the conference program 150 may detect that Participant B 208 is using headset 248 in the conference call 204. For example, Participant B 208 may use the headset 248 to communicate (e.g., talk and listen to feedback) with the other participants (e.g., via conference communication channel 224) during the presentation given by Participant B 208. In another embodiment, Participant B 208 may also use a stand-alone headphone for listening to feedback from the other participants and a separate microphone for talking to the other participants. As previously described, the headphone of the headset 248 or a separate headphone may enable a single user (e.g., Participant B 208) to listen to an audio source (e.g., from Input B 230) privately.

During this presentation, in one embodiment, the conference program 150 may automatically play the captured audio 246 through the headset 248 (or stand-alone headphone) to Participant B 208 without notifying the other participants (e.g., Participant C 210 and Participant D 212) in the conference call 204. In one embodiment, the other participants (e.g., Participant C 210 and Participant D 212) may not hear the captured audio 246 transmitted via the private communication channel 244 because the other participants may not be connected to the private communication channel 244. In one embodiment, the other participants may also be unable to hear the captured audio 246 because the sound of the captured audio 246, played back using the headset 248, may not be picked up by the microphone of the headset 248 for inclusion in the Output B 232 of Participant B's Device B 216.

According to one embodiment, the conference program 150 may indicate the source (e.g., Participant A 206) of the captured audio 246 to Participant B 208 through the headset 248 (e.g., using audio notification). In another embodiment, the conference program 150 may generate and play an audio notification (e.g., in the headset 248) indicating the captured audio 246 is received from Participant A 206. In one embodiment, the audio notification may instruct Participant B 208 to interact with the Device B 216 (e.g., select a specific key) to play the captured audio 246 through the headset 248. In one embodiment, the audio notification may indicate that the captured audio 246 should be played through the headset 248 to prevent the other participants from hearing the message. In one embodiment, while Participant B 208 may be sharing their screen with the other participants, the conference program 150 may block a textual notification of the captured audio 246 from being displayed on Device B 216 to prevent notifying the other participants (e.g., Participant C 210 and Participant D 212) of the received message (e.g., captured audio 246).

According to one embodiment, the conference program 150 may enable Participant B 208 to receive audio inputs from both the conference communication channel 224 and the private communication channel 244 (e.g., concurrently) using the headset 248. For example, during the presentation given by Participant B 208, another participant (e.g., Participant D 212) may verbally ask a question which may be transmitted via conference communication channel 224 and received by the Participant B 208 as part of Input B 230. In one embodiment, Participant B 208 may hear the question through headset 248. Then, Participant A 206 may transmit the captured audio 246 over the private communication channel 244 to help Participant B 208 to answer the question from Participant D 212. As such, the conference program 150 may enable Participant B 208 and the other participants (e.g., Participant A 206 and Participant C 210) to hear the question from Participant D 212 transmitted over the conference communication channel 224. However, the conference program 150 may only enable Participant B 208 to hear (e.g., via headset 248) the answer (e.g., in the captured audio 246) from Participant A 206 transmitted over the private communication channel 244.

As described above, the conference program 150 enable private audio-based communication between a sub-set of participants (e.g., Participant A 206 and Participant B 208) in the conference call 204 without establishing a breakout room or session. The sub-set of participants may communicate privately in the virtual meeting room 222 in a manner that is invisible to the other participants in the virtual meeting room 222. The conference program 150 may dynamically establish the private communication channel 244 as a temporary communication channel for a duration of transmitting the captured audio 246 from the source device to the destination device. Once the transmission is completed, the conference program 150 may cancel the private communication channel 244. In one embodiment, completing the transmission may include playing back the captured audio 246 transmitted to Participant B 208. In one embodiment, the conference program 150 may establish the private communication channel 244 between any sub-set of participants in the virtual meeting room 222, even in situations where the receiving participant (e.g., associated with the destination device) is not the presenter in the virtual meeting room 222.

According to one embodiment, a first participant (e.g., Participant C 210) may wish to privately communicate a message to a second participant (e.g., Participant D 212), where the second participant may not be using the headset 248 for audio input and output. In this embodiment, the second participant's device (e.g., Device D 220) may be using a separate speaker system 256 for playing back audio received in the Input D 238 from the conference communication channel 224 and a microphone 258 for capturing audio of the second participant (e.g., Participant D 212). As described previously, in contrast to a headphone, the speaker system 256 may emit sound into the open air for anyone nearby to hear or get picked up by the microphone 258 and transmitted to the other participants in the conference call 204.

In this embodiment, the conference program 150 may mute Participant C 210 (e.g., first participant) in the conference call 204 in response to receiving a mute request 260 from the Participant C 210. Then, the conference program 150 may generate a captured audio 262 including a live recorded audio snippet and/or a pre-recorded audio snippet from Participant C 210. Next, after determining the destination for the captured audio 262 based on a destination input from Participant C 210, the conference program 150 may generate (e.g., establish) the private communication channel 264 between the source device (e.g., Device C 218 of Participant C 210) and the destination device (e.g., of the second participant; receiving participant). For example, as illustrated in FIG. 2, Participant C 210 may indicate Participant D 212 as the destination for the captured audio 262. In one embodiment, the captured audio 262 may include the audio snippet captured by Device C 218 and may also indicate the source participant and the destination participant (e.g., "C to D"). In this example, the conference program 150 may determine Participant D 212 as the destination for the captured audio 262. As such, the conference program 150 may establish the private communication channel 264 between Device C 218 (e.g., source device) and Device D 220 (e.g., destination device) of Participant D 212 (e.g., second participant). Thereafter, the conference program 150 may transmit the captured audio 262 to Participant D 212 in the conference call 204 over the private communication channel 264.

According to one embodiment, the conference program 150 may detect the receiving Participant D 212 (e.g., second participant) using the separate speaker system 256 for playing back audio (e.g., received via Input D 238) and the microphone 258 for capturing audio (e.g., for Output D 240). In one embodiment, the conference program 150 may apply an automatic mute 266 to an audio portion of the Output D 240 to prevent the sound of the captured audio 262, played on the speaker system 256, from being captured by the microphone 258 and transmitted via the Output D 240 to the other participants (e.g., Participant A 206 and Participant B 208) in the virtual meeting room 22. After applying the mute 266, the conference program 150 may play back the captured audio 262 to Participant D 212 using the speaker system 256.

According to one embodiment, if Participant D 212 is not sharing their screen in the conference call 204, the conference program 150 may display a text notification on Device D 220 indicating the received captured audio 262 from Participant C 2120. In one embodiment, the text notification may instruct Participant D 212 to apply mute 266 prior to playing the captured audio 262 over the speaker system 256.

Figure 3:
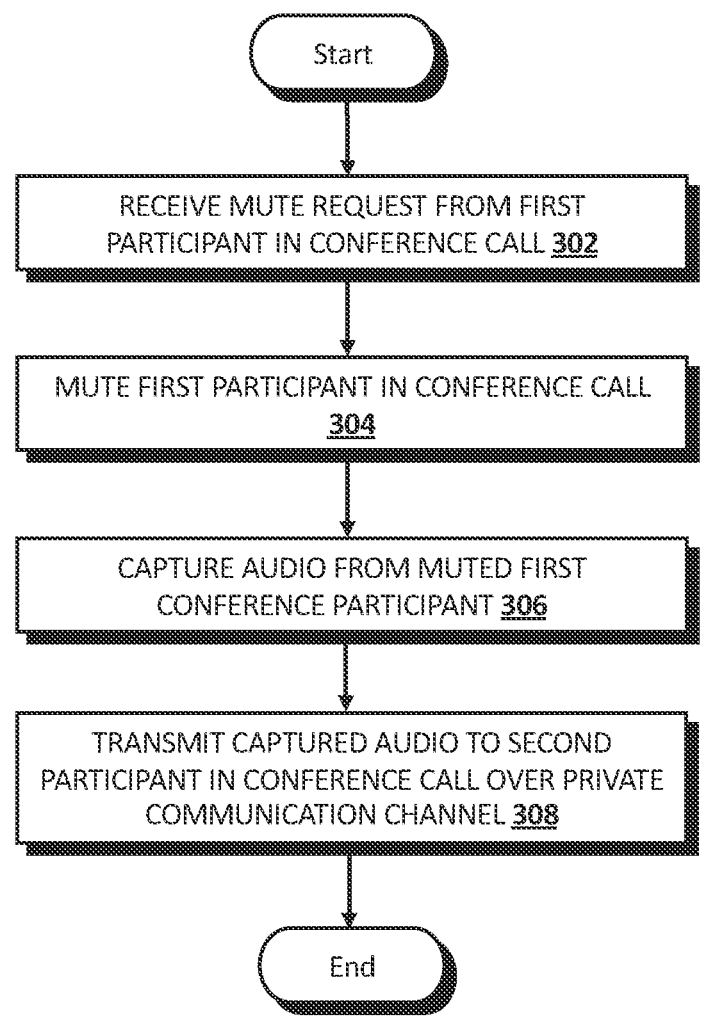
FIG. 3 is an operational flowchart illustrating a process for private communication in a conference call according to at least one embodiment.

Referring now to FIG. 3, an operational flowchart illustrating an exemplary private communication process 300 used by the conference program 150 according to at least one embodiment is depicted. FIG. 3 provides a description of process 300 with reference to the virtual meeting environment 200 (FIG. 2).

At 302, a mute request is received from a first participant in a conference call. According to one embodiment, the conference program 150 may enable a conference call between three or more participants. In one embodiment, a first participant in the conference call may wish to privately communicate an audio message to a second participant without the other participants in the conference call being notified of the private communication. As such, the conference program 150 may extend a mute functionality on the first participant's computing device to establish a private communication channel between the first participant and a second participant. In one embodiment, the first participant may interact with the first participant's computing device (e.g., select a mute option) to transmit a mute request to the conference program 150. The conference program 150 may receive the mute request from the first participant responsive to the first participant interacting with their computing device, as described previously with reference to FIG. 2.

Then at 304, the first participant is muted in the conference call. In response to the first participant's mute request, the conference program 150 may mute the first participant in the conference call 204. More specifically, the conference program 150 may mute an audio output from the computing device of the first participant. As described previously with reference to FIG. 2, audio captured by a microphone associated with the computing device of the first participant may not be included in the output of the computing device and may not be transmitted via a conference communication channel to the other participants in the virtual meeting room of the conference call.

Then at 306, audio is captured from the muted first participant in the conference call. According to one embodiment, the conference program 150 may enable the first participant to use a microphone to record an audio snippet while implementing the first participant's mute request, such that the audio captured by the microphone may not be transmitted to the other participants in the conference call, as described previously with reference to FIG. 2. In one embodiment, responsive to triggering the mute request, the conference program 150 may provide an audio capture option on the computing device of the first participant. In one embodiment, the first participant may select the audio capture option to record (e.g., live record) an audio snippet (e.g., voice message) using their microphone. In some embodiments, the audio capture option may also enable the first participant to select a pre-recorded audio snippet for capture by the conference program 150. Thus, the captured audio from the first participant may include a live recorded audio snippet and/or a pre-recorded audio snippet, as described previously with reference to FIG. 2.

Thereafter at 308, the captured audio is transmitted to a second participant in the conference call over a private communication channel. According to one embodiment, the conference program 150 may enable the first participant to indicate (e.g., define) the second participant or destination for the captured audio. In one embodiment, the conference program 150 may enable the first participant to provide a destination input by using a voice input and/or other computer input to select the destination. Once the conference program 150 determines the destination for the captured audio, the conference program 150 may generate (e.g., establish) the private communication channel between the first participant (e.g., source device; computing device of first participant) and the second participant (e.g., destination device; computing device of second participant), as described previously with reference to FIG. 2. Thereafter, the conference program 150 may transmit the captured audio to the second participant in the conference call over the private communication channel.

According to one embodiment, the conference program 150 may dynamically establish the private communication channel as a temporary communication channel for a duration of transmitting the captured audio from the source device (e.g., of first participant) to the destination device (e.g., of second participant). Once the transmission is completed, the conference program 150 may cancel the private communication channel. In one embodiment, the conference program 150 may establish the private communication channel between any sub-set of participants in the virtual meeting room. As described previously with reference to FIG. 2, the conference program 150 may be implemented if the second or receiving participant (e.g., associated with the destination device) is the presenter in the virtual meeting room. Additionally, and/or alternatively, the conference program 150 may be implemented if the second or receiving participant (e.g., associated with the destination device) is not the presenter in the virtual meeting room.

According to one embodiment, the conference program 150 may detect that the second participant is using a headset in the conference call. In one embodiment, the conference program 150 may automatically play the captured audio through the headset of the second participant without notifying the other participants in the conference call, as described previously with reference to FIG. 2. In another embodiment, the conference program 150 may generate and play an audio notification in the headset of the second participant indicating the captured audio received from the first participant. In one embodiment, the audio notification may instruct the second participant to interact with their computing device to play the captured audio through the headset.

According to one embodiment, a first participant (e.g., Participant C 210) may wish to privately communicate a message to a second participant (e.g., Participant D 212), where the second participant may not be using a headset for audio input and output. In this embodiment, the conference program 150 may detect the second participant's computing device using a separate speaker system for audio play back and a microphone for audio capture. In one embodiment, the conference program 150 may automatically mute an audio portion of the output from the second participant's computing device to prevent the sound of the captured audio, played on the speaker system, from being captured by the microphone of the second participant's computing device and transmitted to the other participants in the virtual meeting room. After applying the mute, the conference program 150 may play back the captured audio to the second participant using the speaker system. In another embodiment, if the second participant is not sharing their screen in the conference call, the conference program 150 may display a text notification on the second participant's computing device indicating the received captured audio from the first participant. In one embodiment, the text notification may instruct the first participant to mute their microphone prior to playing the captured audio over the speaker system.

It is contemplated that the conference program 150 may provide several advantages and/or improvements to the technical field of web conferencing. The conference program 150 may also improve the functionality of a computer because the conference program 150 may enable the computer to establish a private communication channel between select participants in a conference call that is separate from a conference communication channel open to all participants in the conference call. The conference program 150 may also enable the computer to dynamically establish the private communication channel (e.g., on as needed basis) between the select participants in a virtual meeting room without needing to generate a breakout room or session during the conference call (saving computing resources).

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a mute request from a first device of a first participant in a conference call;
muting a first audio output from the first device to the conference call;
capturing an audio from the first participant using a first microphone of the first device, wherein the muted first audio output prevents the captured audio from being heard in the conference call; and
transmitting the captured audio to a second participant in the conference call over a private communication channel.

2. The computer-implemented method of claim 1, wherein the transmitted captured audio is playable to the second participant without notifying other participants in the conference call.

3. The computer-implemented method of claim 1, further comprising:
determining the second participant for receiving the transmitted captured audio based on a destination input from the first participant.

4. The computer-implemented method of claim 1, further comprising:
detecting the second participant using a headset in the conference call; and
playing the transmitted captured audio using the headset of the second participant without notifying other participants in the conference call.

5. The computer-implemented method of claim 1, further comprising:
detecting the second participant using a second device associated with a speaker system in the conference call;
muting a second audio output from the second device to the conference call, wherein the muted second audio output prevents other participants in the conference call from hearing any audio from the speaker system captured by a second microphone associated with the second device; and
playing the transmitted captured audio using the speaker system of the second participant.

6. The computer-implemented method of claim 1, wherein the conference call further comprises a conference communication channel and the private communication channel in a same virtual meeting room, wherein the conference communication channel enables communication between all participants in the virtual meeting room, and wherein the private communication channel enables communication between the first participant and the second participant in the virtual meeting room, without notifying other participants in the virtual meeting room.

7. The computer-implemented method of claim 1, wherein the private communication channel is dynamically established as a temporary communication channel for a duration of completing the transmitted captured audio to the second participant.

8. A computer system for private audio communication in a conference call, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
receiving a mute request from a first device of a first participant in a conference call;
muting a first audio output from the first device to the conference call;

capturing an audio from the first participant using a first microphone of the first device, wherein the muted first audio output prevents the captured audio from being heard in the conference call; and transmitting the captured audio to a second participant in the conference call over a private communication channel.

9. The computer system of claim 8, wherein the transmitted captured audio is playable to the second participant without notifying other participants in the conference call.

10. The computer system of claim 8, further comprising: determining the second participant for receiving the transmitted captured audio based on a destination input from the first participant.

11. The computer system of claim 8, further comprising: detecting the second participant using a headset in the conference call; and playing the transmitted captured audio using the headset of the second participant without notifying other participants in the conference call.

12. The computer system of claim 8, further comprising: detecting the second participant using a second device associated with a speaker system in the conference call;

muting a second audio output from the second device to the conference call, wherein the muted second audio output prevents other participants in the conference call from hearing any audio from the speaker system captured by a second microphone associated with the second device; and playing the transmitted captured audio using the speaker system of the second participant.

13. The computer system of claim 8, wherein the conference call further comprises a conference communication channel and the private communication channel in a same virtual meeting room, wherein the conference communication channel enables communication between all participants in the virtual meeting room, and wherein the private communication channel enables communication between the first participant and the second participant in the virtual meeting room, without notifying other participants in the virtual meeting room.

14. The computer system of claim 8, wherein the private communication channel is dynamically established as a temporary communication channel for a duration of completing the transmitted captured audio to the second participant.

15. A computer program product for private audio communication in a conference call, comprising:

one or more computer-readable storage media and program instructions collectively stored on the one or more computer-readable storage media, the program instructions executable by a processor to cause the processor to perform a method comprising:

receiving a mute request from a first device of a first participant in a conference call;

muting a first audio output from the first device to the conference call;

capturing an audio from the first participant using a first microphone of the first device, wherein the muted first audio output prevents the captured audio from being heard in the conference call; and transmitting the captured audio to a second participant in the conference call over a private communication channel.

16. The computer program product of claim 15, wherein the transmitted captured audio is playable to the second participant without notifying other participants in the conference call.

17. The computer program product of claim 15, further comprising:

determining the second participant for receiving the transmitted captured audio based on a destination input from the first participant.

18. The computer program product of claim 15, further comprising:

detecting the second participant using a headset in the conference call; and playing the transmitted captured audio using the headset of the second participant without notifying other participants in the conference call.

19. The computer program product of claim 15, wherein the conference call further comprises a conference communication channel and the private communication channel in a same virtual meeting room, wherein the conference communication channel enables communication between all participants in the virtual meeting room, and wherein the private communication channel enables communication between the first participant and the second participant in the virtual meeting room, without notifying other participants in the virtual meeting room.

20. The computer program product of claim 15, wherein the private communication channel is dynamically established as a temporary communication channel for a duration of completing the transmitted captured audio to the second participant.

* * * * *